Feb. 12, 1963 W. M. BETTS 3,077,240
FIBER GLASS WET MUFFLER FOR MARINE ENGINES
Filed June 5, 1961 3 Sheets-Sheet 1
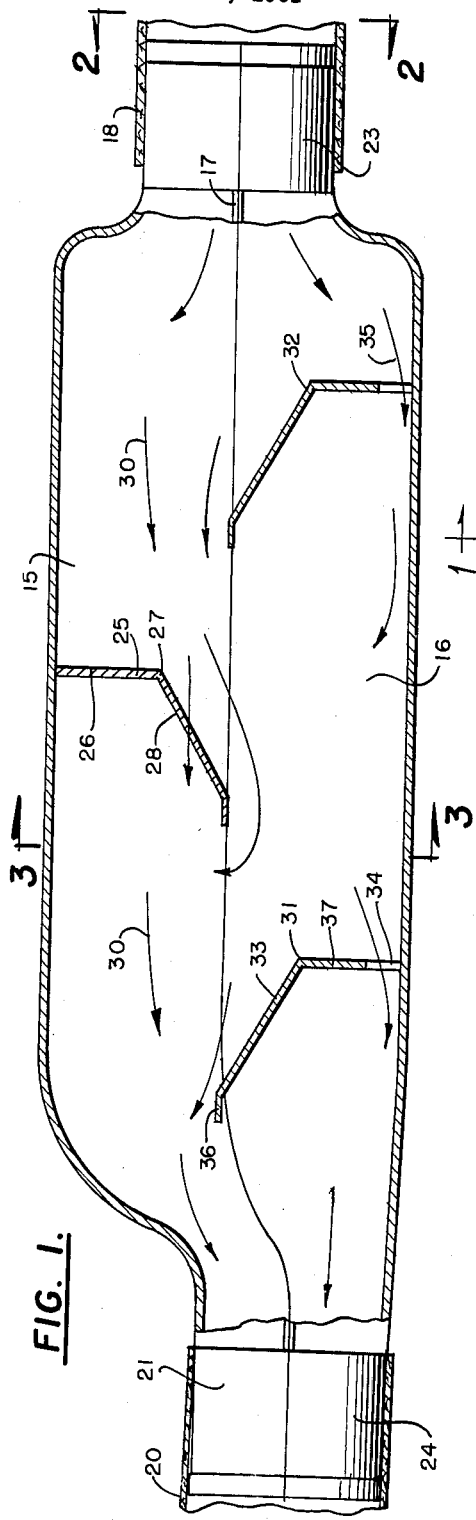
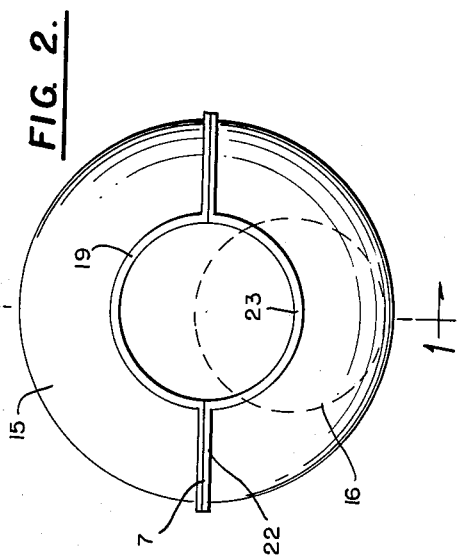
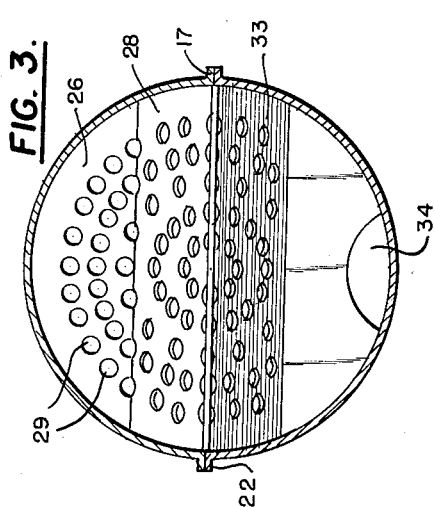
INVENTOR
William M. Betts Feb. 12, 1963 W. M. BETTS 3,077,240
FIBER GLASS WET MUFFLER FOR MARINE ENGINES
Filed June 5, 1961 3 Sheets-Sheet 2
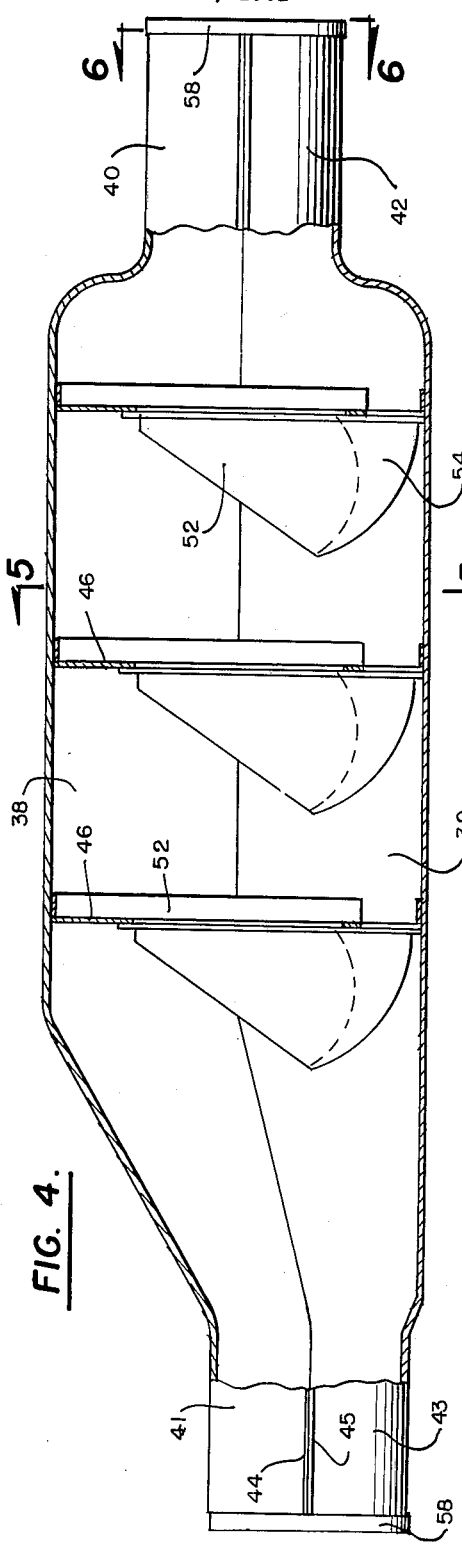
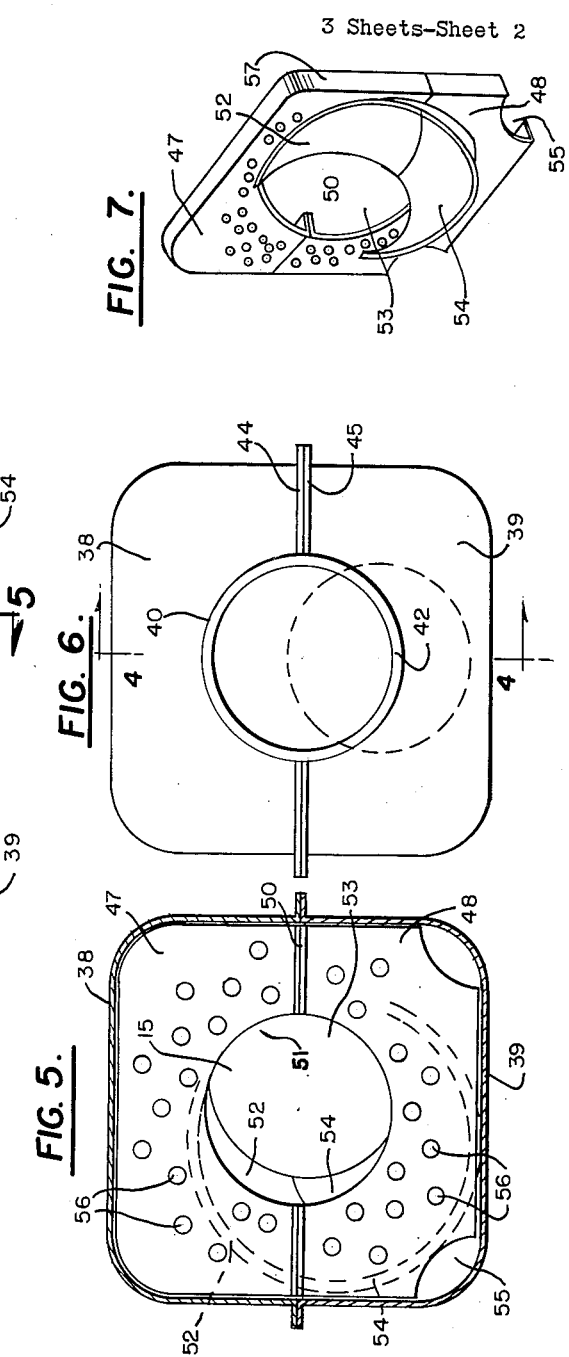
INVENTOR
William M. Betts Feb. 12, 1963  W. M. BETTS  3,077,240
FIBER GLASS WET MUFFLER FOR MARINE ENGINES
Filed June 5, 1961  3 Sheets-Sheet 3
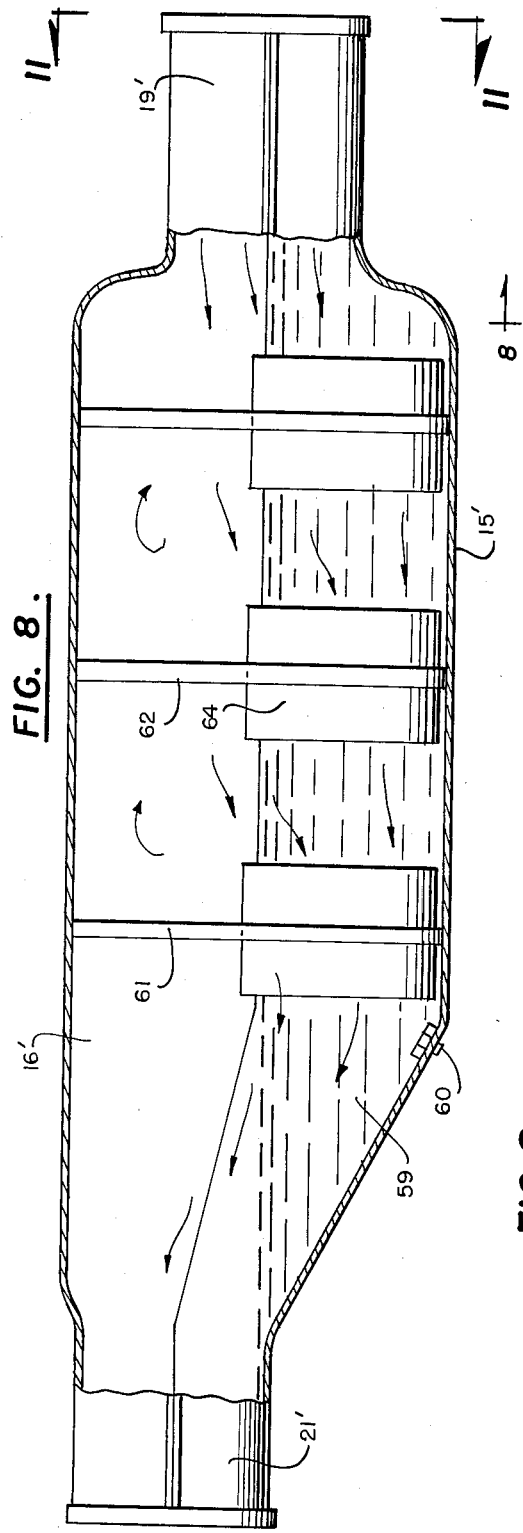
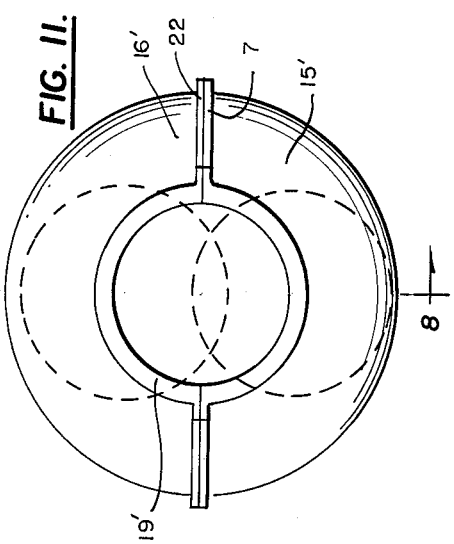
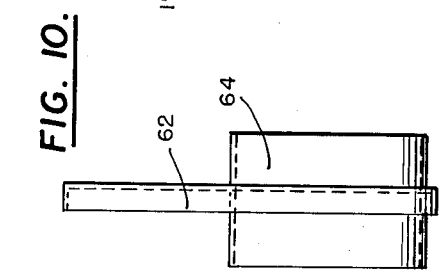
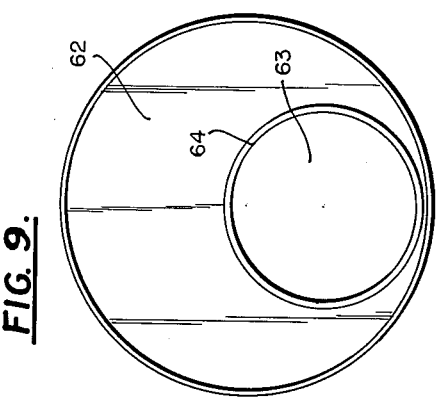
INVENTOR
William M. Betts

United States Patent Office 3,077,240
Patented Feb. 12, 1963

3,077,240
FIBER GLASS WET MUFFLER FOR
MARINE ENGINES
William M. Betts, 2691 NE. 22nd St.,
Pompano Beach, Fla.
Filed June 5, 1961, Ser. No. 114,724
2 Claims. (Cl. 181—52)

This invention relates generally to internal combustion engine exhaust mufflers, and more specifically to improvements in the "wet" type marine engine muffler.

The design of an engine muffler has presented a challenge to the engineer for many years. The deadening of noise, the minimizing of back pressure, and operation at low temperatures are the principal objectives in the design of a good muffler. By careful research I have made substantial improvements in this field, particularly in respect to marine engine mufflers.

It is a primary object of this invention to provide a non metallic "wet" type muffler for marine engines which is exceptionally effective in operation and does not reduce the power output of the engine.

It is a further object of this invention to provide a "wet" type muffler which is formed entirely of fiber glass for effectively discharging the exhaust gases and engine cooling water in a silent and efficient manner.

It is a still further object of this invention to provide a "wet" type muffler of the above class which is simple and rugged in construction, and may be manufactured at a much lower cost than the conventional muffler.

A full understanding of the construction of this invention, together with further novel features and advantages, will be had from the following detailed description of preferred embodiments thereof, taken in conjunction with the attached drawings wherein:

FIG. 1 is a longitudinal sectional view through the improved muffler constructed according to one embodiment of the invention, the view being taken on the line 1—1 of FIG. 2, looking in the direction of the arrows;

FIG. 2 is an end elevation taken along the line 2—2 of FIG. 1.

FIG. 3 is a cross sectional end elevation taken along the line 3—3 of FIG. 1.

FIG. 4 is a longitudinal sectional view of my invention embodied in a housing of another cross section, the view being taken on the line 4—4 of FIG. 6, looking in the direction of the arrows.

FIG. 5 is a cross sectional end elevation taken along the line 5—5 of FIG. 4.

FIG. 6 is an end elevation taken along the line 6—6 of FIG. 4.

FIG. 7 is a perspective view showing the assembled detail of a baffle.

FIG. 8 is a longitudinal sectional view of a third embodiment of the invention wherein the outer shell is inverted so as to permanently trap water therein, the view being taken on the line 8—8 of FIG. 11, looking in the direction of the arrows.

FIG. 9 is a front view of the baffle used in the muffler shown in FIG. 8.

FIG. 10 is a side view of the baffle, and

FIG. 11 is an end elevation of the muffler taken along the line 11—11 of FIG. 8.

Similar reference characters indicate corresponding parts throughout the several views in the drawing.

Referring now to the drawings in detail, and more particularly to the first embodiment shown in FIGS. 1, 2 and 3, the numerals 15 and 16 represents the upper and lower shells of the muffler respectively. The upper shell 15 comprises a fiber glass body semi-circular in cross section and having small radially extending flanges 17 extending outwardly from the diametrically disposed edges. The body terminates towards the inlet pipe 18 with a necked down half sleeve 19 formed concentrically with the body. The outlet or exhaust pipe 20 is formed with a half sleeve 21 disposed below the diameter plane or axis of the sleeve half 19. The flanges 17 curve downwardly with the semi-circular body to form a parting plane in line with the diametric plane of the sleeve half 21. The lower shell 16 is semi-circular in cross section and has similar outwardly extending flanges 22 adapted for registering with the flanges 17. The shell terminates at opposite ends with half sleeves 23 and 24 adapted to form tubular ports in conjunction with the halves 19 and 21 of the upper shell. It will be noted that the outlet pipe 20 is disposed at the same level as the lower shell 16.

An upper baffle 25 is disposed centrally of the upper shell 15 and comprises a transverse portion 26 which is bent at 27 to form an angularly disposed lower portion 28 adapted to terminate across the lower edges of the upper shell. Numerous holes 29 are formed in a symmetrical manner through the baffle 25 for the passage of exhaust gases indicated by arrows 30. Two lower baffles 31 and 32 are spaced apart in the lower shell 16 on opposite sides of the upper baffle 25. The baffles 31 and 32 are similar in shape as the baffle 25 and have perforated sloping plates 33 extending in the direction of flow of gases and water through the muffler. The transverse portion 37 of each of the baffles 31 and 32 is plain and has an arcuate opening 34 enabling the free flow of cooling water 35 therethrough.

The baffles 25, 31 and 32 are sealed by their edges to the periphery of the shell halves and may have outwardly projecting tongues 36. The flanges are removed in the vicinity of the tubular sleeves or ports to provide a true cylindrical shape for securing connecting pipes 18 and 20.

Referring now to FIGS. 4 through 7 which comprise the second embodiment of my invention. This muffler has upper and lower shell halves 38 and 39 which combine to form a baffle of either round, square or rectangular cross section. The upper shell terminates at opposite ends with semi-circular half sleeves 40 and 41 similarly oriented to those in the above described muffler. The half sleeves combine to form complete sleeves or ports with similar half sleeves 42 and 43 which form the ends of the lower shell. The two half shells are sealed together by radial flanges 44 and 45 as in the previous example. In this embodiment there are three baffle plates 46 which extend transversely across the muffler in a spaced relationship. Each baffle comprises two halves 47 and 48 which combine with each other by means of abutting flanges 50. The upper half has a semi-circular opening 51 formed therein and is provided with an arcuate foil 52 which is cemented around one side of the opening as a sub-assembly. The lower half 48 of the baffle has a semi-circular opening 53 adapted to register with the opening 51. An arcuate foil 54 forms a continuation of the foil 52 and curves in a spherical manner about the opening 53. Small cut-out portions 55 form cooling water passages through the lower corners of the half baffle 48. Both halves 47 and 48 have spaced holes 56 formed therethrough for passing turbulent exhaust gases and water. A surrounding flange 57 provided about each half baffle provides a good cementing surface to the inner surface of the muffler. If desired, raised rims 58 may be formed about the ends of the sleeve halves to provide a gripping surface for connecting pipes.

FIGS. 8 through 11 disclose a muffler of similar external configuration to that of FIG. 1, except that the muffler is inverted such that a water trap is formed as indicated at 59. The upper shell is indicated at 16' and a drain plug 60 is disposed in the lower half shell 15' to drain the muffler when required. In this embodiment I employ a different type of baffle plate indicated at 61. There are three transverse baffle plates 61 assembled in the muffler in a longitudinally spaced manner. Each plate comprises a circular disc 62 having a circular hole 63 formed in the lower half of the plate and having a diameter approximately half that of the plate. A short sleeve 64 is mounted to extend through each side of the hole 63 and forms a channel through which all exhaust gases and cooling water must pass. The gases and water become thoroughly intermixed on passing through the baffles and efficient muffling is achieved. The sleeves 64 are preferably formed with the same diameter as the ports 19' and 21' in and out of the muffler.

All of the above described mufflers are fabricated completely of fiber glass, a distinct advantage made possible by the specific baffle designs above set forth.

From the foregoing, it is believed that the construction, operation and advantages of this invention will be fully apparent. However, since numerous modifications will occur to those skilled in the art, it is not desired to limit the construction exactly to that shown and described, and accordingly, modifications and equivalents may be resorted to, falling within the scope of the appended claims.

I claim:
1. A "wet" type muffler for marine engines comprising, an elongated shell composed of fiber glass and consisting of joined upper and lower shell sections, said shell having inlet and outlet ports respectively located at its opposite ends, said ports being located in axial disalignment, a plurality of spaced baffle plates within the shell, each plate being provided with a central aperture surrounded by a plurality of holes, an arcuate foil disposed on each baffle plate at the central aperture therein, said foil being disposed at one edge of the aperture and having parts which extend into both the upper and lower sections of the shell.

2. A "wet" type muffler for marine engines as provided for in claim 1, wherein each baffle plate is composed of upper and lower sections, and each foil extends partially around the central aperture at one side thereof, with a major portion of the foil located in the lower shell section and a minor portion located in the upper shell section, and each baffle plate being notched in the lower portion of its lower section.

References Cited in the file of this patent

UNITED STATES PATENTS

| | | |
|---|---|---|
| 1,474,115 | Heather | Nov. 13, 1923 |
| 1,688,488 | Dormeyer | Oct. 23, 1928 |
| 1,821,688 | Bourne | Sept. 1, 1931 |
| 2,238,816 | Maxim et al. | Apr. 15, 1941 |
| 2,516,948 | Bourne | Aug. 1, 1950 |
| 2,541,373 | McLeod | Feb. 13, 1951 |
| 2,723,705 | Collins | Nov. 15, 1955 |
| 2,843,153 | Young | July 15, 1958 |
| 2,859,830 | Hoffar | Nov. 11, 1958 |

FOREIGN PATENTS

| | | |
|---|---|---|
| 366,257 | Great Britain | Feb. 4, 1932 |